United States Patent
Epstein et al.

(10) Patent No.: US 10,114,162 B2
(45) Date of Patent: Oct. 30, 2018

(54) OPTICAL FILM STACK WITH RETARDANCE LAYER HAVING IN-PLANE RETARDANCE OF GREATER THAN 2.0 MICRONS

(75) Inventors: Kenneth A. Epstein, St. Paul, MN (US); Adam D. Haag, Woodbury, MN (US); Seo-Hern Lee, Kyonggi-Do (KR); Youn Sihn Kim, Seoul (KR); Myeong-Kyun Kang, Gyeonggi-Do (KR)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 13/977,954

(22) PCT Filed: Jan. 13, 2012

(86) PCT No.: PCT/US2012/021291
§ 371 (c)(1),
(2), (4) Date: Jul. 2, 2013

(87) PCT Pub. No.: WO2012/099794
PCT Pub. Date: Jul. 26, 2012

(65) Prior Publication Data
US 2013/0335823 A1    Dec. 19, 2013

Related U.S. Application Data

(60) Provisional application No. 61/433,812, filed on Jan. 18, 2011.

(51) Int. Cl.
G02B 5/30        (2006.01)
G02F 1/1335    (2006.01)
(Continued)

(52) U.S. Cl.
CPC ......... *G02B 5/3083* (2013.01); *G02B 5/0215* (2013.01); *G02B 5/3041* (2013.01); *G02F 1/133536* (2013.01); *G02F 1/133634* (2013.01)

(58) Field of Classification Search
None
See application file for complete search history.

(56) References Cited

U.S. PATENT DOCUMENTS 5,808,794 A    9/1998    Weber
5,828,488 A    10/1998    Ouderkirk
(Continued)

FOREIGN PATENT DOCUMENTS

EP    1 498 768 A1    1/2005
EP    1498770          1/2005
(Continued)

OTHER PUBLICATIONS

International Application PCT/US2012/021291 Search Report dated Apr. 23, 2012.
(Continued)

*Primary Examiner* — Stephone B Allen
*Assistant Examiner* — Ryan S Dunning
(74) *Attorney, Agent, or Firm* — Daniel J. Iden (57) ABSTRACT

Optical film stacks are disclosed. The optical film stacks can include a first reflective polarizer, a second reflective polarizer, and a retardance layer disposed between the first reflective polarizer and the second reflective polarizer.

23 Claims, 9 Drawing Sheets

(51) Int. Cl.
*G02B 5/02* (2006.01)
*G02F 1/13363* (2006.01)

(56) References Cited

U.S. PATENT DOCUMENTS

| | | | |
|---|---|---|---|
| 5,882,774 A | 3/1999 | Jonza | |
| 6,025,897 A | 2/2000 | Weber | |
| 6,070,093 A * | 5/2000 | Oosta | A61B 5/0095 356/39 |
| 6,179,948 B1 | 1/2001 | Merrill | |
| 6,268,961 B1 | 7/2001 | Nevitt | |
| 6,498,683 B2 | 12/2002 | Condo | |
| 6,697,195 B2 | 2/2004 | Weber | |
| 7,245,431 B2 | 7/2007 | Watson | |
| 7,446,827 B2 | 11/2008 | Ko | |
| 7,492,516 B2 | 2/2009 | Takahashi | |
| 9,158,156 B2 | 10/2015 | Miyatake et al. | |
| 2002/0039235 A1 | 4/2002 | Condo | |
| 2005/0206817 A1* | 9/2005 | Kajita et al. | 349/119 |
| 2006/0098452 A1* | 5/2006 | Choi | G02B 6/005 362/607 |
| 2006/0262401 A1 | 11/2006 | Takahashi | |
| 2007/0064168 A1 | 3/2007 | Shiraogawa | |
| 2007/0236636 A1* | 10/2007 | Watson | G02B 6/0056 349/117 |
| 2008/0068545 A1* | 3/2008 | Doi | B32B 27/36 349/118 |
| 2008/0151371 A1* | 6/2008 | Weber et al. | 359/487 |
| 2008/0225201 A1* | 9/2008 | Hoshi | 349/62 |
| 2010/0128351 A1 | 5/2010 | Epstein | |

FOREIGN PATENT DOCUMENTS

| | | |
|---|---|---|
| JP | H11-194217 A | 7/1999 |
| JP | 2003215563 A | 7/2003 |
| JP | 2004004764 A | 1/2004 |
| JP | 2004354678 A | 12/2004 |
| JP | 2005128216 A | 5/2005 |
| WO | WO 95117699 A1 | 6/1995 |
| WO | WO 2000/75560 | 12/2000 |
| WO | WO 2002/31540 | 4/2002 |
| WO | WO 2006/044292 | 4/2006 |
| WO | WO 2006/044475 | 4/2006 |
| WO | WO 2006/107978 A2 | 10/2006 |
| WO | WO 2007/067603 | 6/2007 |
| WO | WO 2007/087191 | 8/2007 |
| WO | WO 2007/121064 A2 | 10/2007 |
| WO | WO 2008/005760 | 1/2008 |
| WO | WO 2008/144656 | 11/2008 |

OTHER PUBLICATIONS

International Application PCT/US2012/021291 Written Opinion dated Apr. 23, 2012.

* cited by examiner

OPTICAL FILM STACK WITH RETARDANCE LAYER HAVING IN-PLANE RETARDANCE OF GREATER THAN 2.0 MICRONS

FIELD

The present description relates to optical film stacks. Specifically, the present description relates to optical film stacks containing dual reflective polarizers, a retardance layer, and potentially a brightness enhancing layer.

BACKGROUND

Display devices, such as liquid crystal display (LCD) devices, are used in a variety of applications, including, for example, televisions, hand-held devices, digital still cameras, video cameras, and computer monitors. Several of these devices include an LC panel and a backlight. The backlight typically couples light from one or more sources (e.g., a cold cathode fluorescent tube (CCFT) or light emitting diode(s) (LEDs)) to the LC panel.

Some display devices also include one or more optical film stacks placed between the backlight and the LC panel. Optical film stacks may be designed to improve output luminance, illumination uniformity, viewing angle, pixel integrity, contrast ratio and overall system efficiency.

SUMMARY

In one aspect, the present description relates to an optical film stack. The optical film stack includes a first reflective polarizer, a second reflective polarizer, and a retardance layer. The retardance layer is disposed between the two reflective polarizers and has a thickness d, in-plane index of refraction values $n_x$ and $n_y$, and an index of refraction $n_z$ in a direction orthogonal to the plane of the film. The following properties are true of the relationship between indices of refraction and thickness of the retardance layer: $0.04 < [|(n_x - n_y)|/|(0.5(n_x+n_y) - n_z)|] < 1.00$, and $0.25 < d \times |(n_x - n_y)| < 75$. In some embodiments, the quantity $[|(n_x - n_y)|/|(0.5(n_x+n_y) - n_z)|]$ may be greater than 0.12 or greater than 0.15 and may be less than 0.50 or less than 0.33. Also, in certain embodiments, the quantity $[d \times |(n_x - n_y)|]$ may be greater than 0.75 microns and may be less than 25 microns or less than 20 microns.

In another aspect, the present description relates to another optical film stack. The optical film stack includes a first reflective polarizer, a second reflective polarizer, a retardance layer, and a brightness enhancement film. The retardance layer is disposed between the two reflective polarizers and has a thickness d, in-plane index of refraction value $n_x$ and $n_y$, and an index of refraction $n_z$ in a direction orthogonal to the plane of the film. The following properties are true of the relationship between indices of refraction and thickness of the retardance layer: $0.04 < [|(n_x - n_y)|/|(0.5(n_x+n_y) - n_z)|] < 1.00$, and $0.25$ microns $< d \times |(n_x - n_y)| < 75$ microns. The brightness enhancement film has a first and second major surface. The first major surface is attached to the second reflective polarizing film on a side opposite the retardance layer, and the second major surface is a structured surface that includes a plurality of prismatic structures. In some embodiments, the quantity $[|(n_x - n_y)|/|(0.5(n_x+n_y) - n_z)|]$ may be greater than 0.12 or greater than 0.15 and may be less than 0.50 or less than 0.33. Also, in certain embodiments, the quantity $[d \times |(n_x - n_y)|]$ may be greater than 0.75 microns and may be less than 25 microns or less than 20 microns.

DETAILED DESCRIPTION

Optical film stacks serve a variety of different purposes in display devices, such as liquid crystal (LC) devices. For example, some stacks can improve the on-axis brightness gain and contrast ratio of LC displays.

The present disclosure provides optical film stacks that can improve these characteristics. In some embodiments, an optical film stack includes a first reflective polarizer and a second reflective polarizer, and a retardance layer that is placed between the two reflective polarizers. The retardance layer further has an optimal in-plane to out-of-plane ratio which is defined as the difference in the in-plane indices of refraction (x vs. y) divided by the difference between in-plane index of refraction and out-of-plane index of refraction (x and y vs. z). The retardance layer also exhibits an optimal retardance, which is defined as the retardance layer thickness times the difference in the in-plane indices of refraction.

In some embodiments, the optical film stack may further include a brightness enhancement film placed on the opposite side of the second reflective polarizer from the retardance layer. The brightness enhancement film may include a plurality of prismatic structures on one of its surfaces.

Figure 1:
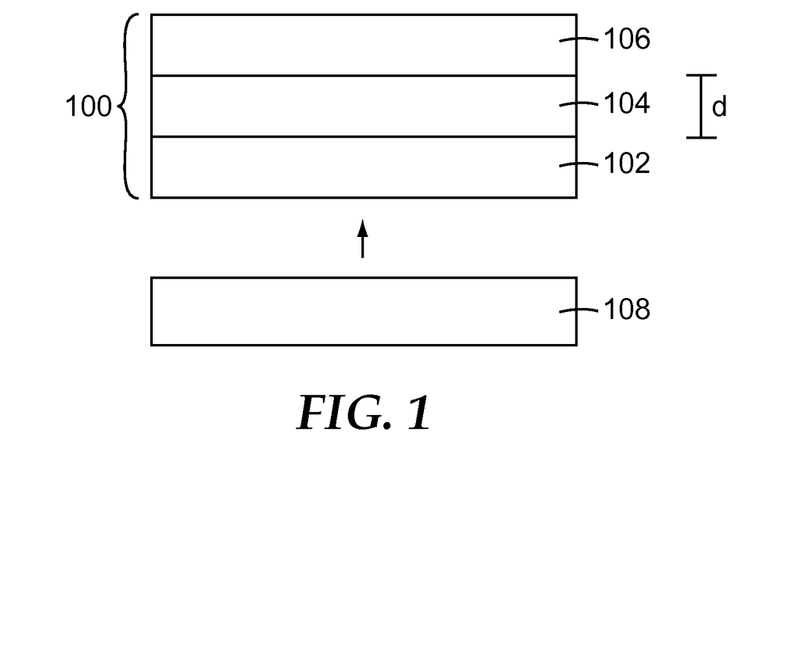
FIG. 1 is a cross-sectional view of one embodiment of an optical film stack and a back light.

FIG. 1 illustrates one embodiment of an optical film stack 100. Optical film stack 100 includes a first reflective polarizer 102, a second reflective polarizer layer 106, and a retardance layer 104 disposed between the first reflective polarizer and the second reflective polarizer. In at least some embodiments, the optical film stack 100 as shown in FIG. 1 (and including first reflective polarizer 102, retardance layer 104, and second reflective polarizer 106) may be referred to herein as a "dual reflective polarizer construction."

Each of the first and second reflective polarizers can have a pass axis and a block axis. In at least some embodiments, the pass axis and block axis of the first and second reflective polarizers are parallel or at least substantially parallel.

The first and second reflective polarizers 102, 106 can include any suitable reflective polarizer or polarizers, e.g., multilayer optical film (MOF) reflective polarizers; diffusely reflective polarizing film (DRPF), such as continuous/disperse phase polarizers; wire grid reflective polarizers; fiber polarizers, linear polarizers or cholesteric reflective polarizers. Where a cholesteric polarizer is used, such a polarizer may be part of a linear polarizer construction comprising a circular polarizer and a quarter wave film.

Figure 4:
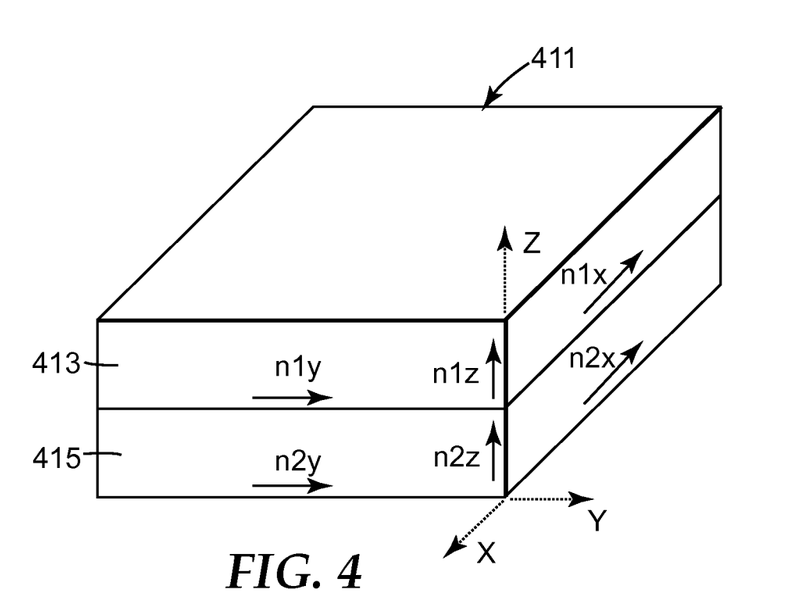
FIG. 4 is a schematic perspective view of one embodiment of a reflective polarizer.

FIG. 4 illustrates one exemplary embodiment of a reflective polarizer according to the present disclosure The reflective polarizer is a multilayer optical film 411 that includes a first layer of a first material 413 disposed (e.g., by coextrusion) on a second layer of a second material 415. The depicted optical film 411 may be described with reference to three mutually orthogonal axes x, y and z. Two orthogonal axes x and y are in the plane of the film 411 (in-plane, or x and y axes) and a third axis (z-axis) extends in the direction of the film's thickness (or orthogonal to both the x and y axes). One or both of the first and second materials may be birefringent.

While only two layers are illustrated in FIG. 4 and generally described herein, typical embodiments of the present disclosure include two or more of the first layers interleaved with two or more of the second layers. The total number of layers may be hundreds or thousands or more. In some exemplary embodiments, adjacent first and second layers may be referred to as an optical repeating unit. Reflective polarizers suitable for use in exemplary embodiments of the present disclosure are described in, for example, U.S. Pat. Nos. 5,882,774, 6,498,683, 5,808,794, and PCT Patent Publication No. WO2008/144656, each of which is incorporated herein by reference in its entirety. Commercially available examples of MOF reflective polarizers include DBEF-D200 and DBEF-D440 multilayer reflective polarizers that include diffusive surfaces, available from 3M Company.

The optical film 411 may include additional layers. The additional layers may be optical, e.g., performing an additional optical function, or non-optical, e.g., selected for their mechanical or chemical properties. As discussed in U.S. Pat. No. 6,179,948, incorporated herein by reference, these additional layers may be oriented under the process conditions described herein, and may contribute to the overall optical and/or mechanical properties of the film, but for the purposes of clarity and simplicity these layers will not be further discussed in this application.

For the purposes of the present disclosure, it is preferred that thick biaxially birefringent outer layers are not disposed on the side of the polarizer that faces a display panel. If thick outer layers are needed on the side of the polarizer that is intended to face the display once installed, such layers should be removable or they should be made of isotropic or only weakly biaxially birefringent materials.

In a birefringent reflective polarizer, the refractive indices of the first layers 413 ($n_{1x}$, $n_{1y}$, $n_{1z}$) and those of the second layers 415 ($n_{2x}$, $n_{2y}$, $n_{2z}$) are substantially matched along one in-plane axis (y-axis) and are substantially mismatched along another in-plane axis (x-axis). The matched direction (y) forms a transmission (pass) axis or state of the polarizer, such that light polarized along that direction is preferentially transmitted, and the mismatched direction (x) forms a reflection (block) axis or state of the polarizer, such that light polarized along that direction is preferentially reflected. Generally, the larger the mismatch in refractive indices along the reflection direction and the closer the match in the transmission direction, the better the performance of the polarizer.

Other exemplary reflective polarizers suitable for use in dual reflective polarizer constructions according to the present disclosure are also described in U.S. Pat. No. 6,697,195, hereby incorporated by reference herein.

Referring again to FIG. 1, light travels from a back light 108 and is incident upon first reflective polarizer 102. Generally, the first reflective polarizer will transmit all or substantially all of a first polarization of light (e.g. light polarized along the x-direction), and will reflect a majority of the second orthogonal polarization of light (e.g., light polarized along the y-direction). The backlight may be understood as one of any number of potential light sources, such as cold cathode fluorescent lamps (CCFLs), external electrode fluorescent lamps (EEFLs), flat fluorescent lamps (FFLs) and light emitting diodes (LEDs). The backlight may also be made up of a number of partials, including, for example, a back reflector, a lightguide and a diffuser sheet or diffuser plate and any other number of elements commonly used in the art for backlighting.

The light that is reflected by the optical film stack may be returned to back light 108. Although a majority of light of the second orthogonal polarization state light is reflected, generally the reflective polarizers are not "perfect." Therefore, there will be leakage of light of the second orthogonal polarization state through the reflective polarizer such that 10% of the light may be impure. For example, in some embodiments, 90% of light transmitted through first reflective polarizer 102 is of the polarization that will be accepted by the absorbing polarizer of a typical LC panel, i.e., the polarization of the light transmitted by the film stack will be substantially parallel to the pass axis of the rear absorbing polarizer of the panel. As 90% of light incident upon the second reflective polarizer has this desired polarization, the second reflective polarizer serves to further clean up this light. Assuming the pass axes of the second reflective polarizer 106 and first reflective polarizer 102 are aligned), the second reflective polarizer will further reduce the transmission of light having the undesired polarization. This equates to a second leakage 10% of the 10% of light of light incident upon polarizer 106. Therefore, 99% of the light that is transmitted through second reflective polarizer 106 is of the desired polarization. The light of the undesired polarization is reflected towards first reflective polarizer 102.

Because of this recycling effect, were there no retardance layer 104 between the first reflective polarizer 102 and second reflective polarizer 106, reflected light would simply bounce back and forth between the first and second reflective polarizers and eventually be absorbed, thereby decreasing the efficiency of the stack. The retardance layer 104 can shift the phase of the light bouncing between the first reflective polarizer 102 and second reflective polarizer 106 such that the polarization of the light reflected by the second reflective polarizer is converted to the desired polarization.

Further a variety of materials and techniques can be used to form a retardance layer 104. In some embodiments, the retardance layer includes a layer of simultaneous biaxially stretched polymeric film that is substantially non-absorbing and non-scattering for at least one polarization state of visible light, and that has x, y, and z orthogonal indices of refraction, where at least two of the orthogonal indices of refraction are not equal.

Any polymeric material capable of being stretched and that exhibits the optical properties described herein can be used to form the retardance layer. These polymers can include, for example, polyolefins, polyacrylates, polyesters, polycarbonates, fluoropolymers and the like. One or more polymers can be combined to form the retarder. Suitable polyolefins include for example, cyclic olefin polymers such as, for example, polystyrene, norbornene and the like; non-cyclic olefin polymers such as, for example, polypropylene; polyethylene; polybutylene; polypentylene; and the like. A specific polybutylene is poly(1-butene). A specific polypentylene is poly(4-methyl-1-pentene). Suitable polyacrylates include, for example, acrylates, methacrylates and the like. Examples of specific polyacrylates include poly(methyl methacrylate), and poly(butyl methacrylate). Fluoropolymer specifically includes, but is not limited to, poly(vinylidene fluoride). In one embodiment, the polymeric material may be polyethylene teraphthalate (PET).

Figure 2:
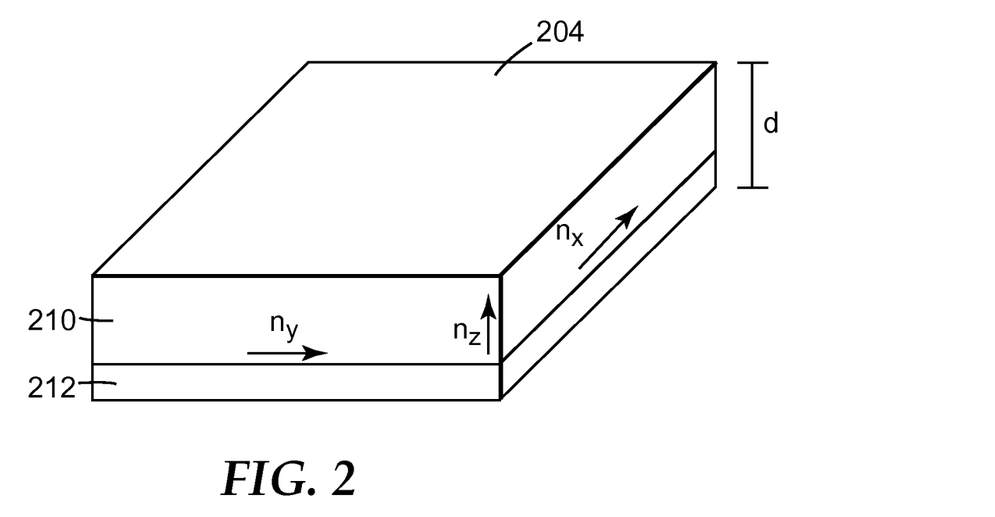
FIG. 2 is a schematic perspective view of one embodiment of a retardance layer.

In one exemplary embodiment, as shown in FIG. 2, a retardance layer 204 can include two or more birefringent retardance sublayers 210 and 212. The two or more birefringent retardance sublayers 210, 212 be aligned, e.g., the fast axis of the first sublayer 210 can be substantially parallel to the fast axis of the second sublayer 212. In other embodiments the retardance sublayers are crossed (i.e. orthogonal to one another). Where sublayers 210 and 212 are crossed, indices of refraction $n_x$, $n_y$, and $n_z$ of the two retardance sublayers in layer 204 may each be determined separately to fall within the in-plane to out-of-plane birefringence ratios and retardance values discussed further below.

In a number of embodiments, the retardance sublayers will have fast axes that are aligned, and therefore may be understood as having a single fast axis. In other embodiments, the retarder will be made up of only one retardance layer with a single fast axis. In either case, the fast axis for the retarder may in many cases be parallel or nearly parallel with the pass axis of the first reflective polarizer. For example, the pass axis of the first reflective polarizer may be within 20 degrees of parallel with the fast axis of the retarder, or within 15 degrees, or within 10 degrees, or within 5 degrees of parallel.

Retardance layer 204 may be understood as having a thickness (in the direction orthogonal to the primary plane of the films) labeled as d. The retardance layer has an index of refraction in the x-direction, $n_x$, and index of refraction in the y-direction, $n_y$, and an index of refraction in the z-direction, $n_z$. A number of simulations were performed to determine the effect of the retardance layer on the transmission "envelope" as well as the fringe density.

The current description provides for retardance layers with specific retardance values that provide for high gain and contrast ratio of a display when the layer is used with a first and second reflective polarizer.

Incoherent optical gain, herein referred to as gain, is a unitless measure of the brightness amplification when a gain component, e.g. a film or foil, is added to a backlight. The requirements for gain are an optical cavity that confines light between back-reflector and a partial reflector, the partial reflector preferentially transmitting light from preferred directions and reflecting light from different preferred directions or transmitting light of preferred polarization states and reflecting light of different preferred polarization states. Such partial reflectors are gain components, which may be stacked together to amplify gain e.g. a prismatic gain film and a reflective polarizer. A further requirement is that the back reflector also mixes the states of incident light.

The gain equation is a sum of an infinite series of partial reflections, wherein the preferred reflected light is recycled in the gain cavity and feeds the preferred transmitted direction or polarization. The gain equation for the simple case of a perfectly lambertian reflector and a reflective polarizer followed by an ideal absorbing polarizer is:

$$G = T_{Axial}/(1 - R' \times R_{Hemi}),$$

where $T_{Axial}$ is the transmission of the preferred polarization state in the axial direction, R' is the reflectance of the lambertian reflector, and $R_{Hemi}$ is the total reflectance of the reflective polarizer under lambertian illumination. In the case of a prismatic gain film, the preferred input direction is different from the preferred output direction, but $R_{Hemi}$ has the same meaning. The gain equation is a good approximation provided that the reflector is substantially diffuse and/or polarization scattering.

Gain is commonly specified on axis, but the formal description is meaningful in an arbitrary direction $(\Theta, \Phi)$ where $T(\Theta, \Phi)$ replaces $T_{Axial}$ in the gain equation. The directional property of the gain is often represented in a polar plot, sometimes referred to as a conoscopic plot, such as FIG. 6A where the plot coordinates are $\Theta$ and $\Phi$ and the quantity displayed is gain, or transmission, or simply luminance.

In the case of a reflective polarizer, the polar plot may be substantially flat or slowly varying, whereas a structured brightness enhancement film such as BEF exhibits substantial variation with direction and a contiguous central region of high gain. Generally, the near-axis gain varies inversely with the solid angle quantity of the central maximum. In any case, contiguous and smoothly varying properties are preferred.

In looking at the specific nature of the in-plane retardance difference $|(n_x - n_y)|$ and the average-in-plane retardance vs. out-of-plane retardance (i.e. $|0.5(n_x+n_y) - n_z|$) and the ratios associated therewith, it is apparent that the index of refraction values chosen for $n_x$, $n_y$, and $n_z$ in the retardance layer can be quite important for achieving the desired gain and contrast ratios of a given system. Where the in-plane refractive index difference is lowest (zero), there are large nodes of maximum intensity and nodes where little or no light is transmitted. Where the in-plane refractive index differential is higher (e.g. 0.10), one will see greater luminance uniformity without luminance minima, which may be highly beneficial for display purposes.

However, although there may be better brightness uniformity, where the film is thin, the display may exhibit slow and noticeable oscillations of the brightness lobes. The thicker the film is constructed, the faster the oscillation of the lobes in the image. Eventually, at a given thickness, the intensity oscillations and associated color fringes will no longer be perceived by the human eye. A weak diffuser is sufficient to break up residual fringes in some cases. However, diffusion also tends to reduce optical gain.

Thus, the present disclosure provides the discovered region where the most beneficial index of refraction values of the retardance layer fall (with relation to one another), such that the brightness lobes or fringes are small, and the center brightness region of an image is large. The present disclosure also provides a system where the lobes or fringes oscillate quickly enough that they are not detectable by the human eye.

The entirety of the transmission or brightness lobes may be understood as a transmission "envelope." The important metrics of fringe size and position, and envelope size and shape may be, in essence, measured according to the correlated values of in-plane to out-of-plane ratio and retardance, which are defined further herein. Hence, the dual reflective polarizer construction that includes the described retardance layer or layers between the polarizers can provide a high brightness, high contrast ratio display, with minimal observed defects. This ability to achieve a large, high brightness transmission envelope without problematic oscillations in the image allows for improved optical gain and contrast ratio.

To achieve the highest gain and contrast ratio for an LC panel display, the retardance layer fell within a specific "in-plane to out-of-plane ratio" value and a "retardance" value. The in-plane to out-of-plane ratio is defined as the in-plane index of refraction difference versus the out-of-plane index of refraction difference, where the out-of-plane index of refraction difference is the difference between the average of $n_x$ and $n_y$ and $n_z$.

The equation for in-plane to out-of-plane ratio is

In-plane to out-of-plane ratio=$0.04 < [|(n_x-n_y)|/|(0.5(n_x+n_y)-n_z)|] < 1.00$.

In writing this equation, it is to be noted that the terms $|(n_x-n_y)|$ and $|(0.5(n_x+n_y)-n_z)|$ both are taking the absolute value of the quantity. Therefore, the in-plane to out-of plane ratio should always be positive. The value of the in-plane retardance, herein referred to as retardance, is defined as the product of thickness times the in-plane birefringence and may be understood by the following equation:

Retardance=$0.25$ microns$< d \times |(n_x-n_y)| < 75$ microns.

In writing this equation, again the value of $(n_x-n_y)$ is the absolute value. Therefore, the retardance value defined in this description will always be positive. The values to achieve optimal gain and contrast ratio were then determined. In one embodiment, the in-plane to out-of-plane ratio has a value of greater than 0.04. In another embodiment, the in-plane to out-of-plane ratio has a value of greater than 0.12. In another embodiment, the in-plane to out-of-plane ratio has a value of greater than 0.15. In one embodiment, the in-plane to out-of-plane ratio has as value of less than 1.00. In another embodiment, the in-plane to out-of-plane ratio has as value of less than 0.50. In another embodiment, the in-plane to out-of-plane ratio has as value of less than 0.33.

Necessary retardance was also determined In one embodiment, $d \times |(n_x-n_y)|$ is greater than 0.25 microns and less than 75 microns. In another embodiment, $d \times |(n_x-n_y)|$ is greater than 0.75 microns and less than 25 microns. In another embodiment, $d \times |(n_x-n_y)|$ is greater than 0.75 microns and less than 20 microns.

Simulations were performed using the "Hamster" Ray-Tracing application developed and used internally by 3M Company (St. Paul, Minn.). The Ray-Tracing Application is a software code that serves equivalent functions to other ray-tracing programs such as TracePro (from Lambda Research Corp., Littleton, Mass.), or LightTools (from Optical Research Associates, Calif.). Film stack parameters are entered into a Microsoft-Excel based spreadsheet where a VBA macro inserts the parameters into HAMSTER, launches the raytrace, and displays the result in a polar plot.

The reflective polarizer was modeled in HAMSTER as a basic reflective polarizer (i.e., a layer in the ray tracing program with specified transmission and reflection coefficients where for one polarization the transmission (reflection) coefficient is relatively large (small) and for the orthogonal polarization the reflection (transmission) coefficient is relatively large (small)) with skin layers (i.e. thin layers with a specified index of refraction and thickness) added to the top and bottom of the basic reflective polarizer. The parameters were chosen so that the optical performance substantially matched results for DBEF-Q (a reflective polarizer available from 3M Company).

Dual reflective polarizer film stacks were modeled as a retarder layer between two reflective polarizers (each modeled as described above) with the retarder coupled to the reflective polarizers by 10 micron thick adhesive layers having a refractive index of 1.5. The retarder was modeled by specifying a thickness, absorption coefficient, and three indices of refraction: $n_x$, $n_y$, $n_z$.

Ray tracing simulations were performed for the various model parameters shown in Table 1. The absorption coefficient for these examples was taken to be 0.09 mm$^{-1}$, which is a typical value some stretched films such as PET or PEN. Gain was computed from the simulations and is reported in Table 1 for fast axis at 0 degrees. For comparison, the gain of DBEF-Q alone was 1.66, which is consistent with the value achieved in a typical LCD backlight. It is understood that gain depends upon the effective backlight reflectance R'. Here, R' was taken to be 84.6%. Gain also depends upon the gain film absorption. Hence, reducing the absorption coefficient of the retarder serves to increase the gain.

The degree of fringing for each of the examples was determined from conoscopic plots and this is described in Table 1 with a high/low rating. Also described in Table 1 is a rating of the solid angle in the conoscopic plots having high gain.

TABLE 1

| Ex. | Thickness (microns) | In-plane Birefring. | Out-of-plane Birefring. | Ratio of In-plane to Out-of-plane Birefring. | $d(n_x - n_y)$ (μm) | Gain | Fringe Level | Solid Angle of High Gain Region |
|---|---|---|---|---|---|---|---|---|
| 1 | 76.2 | 0.02 | 0.168 | 0.12 | 1.52 | 1.78 | Low | Large |
| 2 | 76.2 | 0.038 | 0.168 | 0.23 | 2.9 | 1.70 | Low | Large |
| 3 | 76.2 | 0.1 | 0.135 | 0.74 | 7.6 | 1.59 | Low | Very Large |
| 4 | 254 | 0.1 | 0.135 | 0.74 | 25.4 | 1.54 | Low | Very Large |
| C1A | 7.62 | 0.038 | 0.168 | 0.23 | 0.29 | 1.74 | High | Large |
| C1B | 7.62 | 0.038 | 0.168 | 0.23 | 0.29 | 1.75 | High | Large |
| C2 | 800 | 0.1 | 0.135 | 0.74 | 80 | 1.36 | Low | Very Large |
| C3 | 76.2 | 0.005 | 0.25 | 0.02 | 0.38 | 1.80 | Low | Small |

TABLE 1-continued

| Ex. | Thickness (microns) | In-plane Birefring. | Out-of-plane Birefring. | Ratio of In-plane to Out-of-plane Birefring. | $d(n_x - n_y)$ (μm) | Fringe Gain Level | Solid Angle of High Gain Region |
|---|---|---|---|---|---|---|---|
| C4 | 254 | 0.1 | 0.02 | 5.0 | 7.6 | 1.53 Low | Very Large |

Figure 6A:
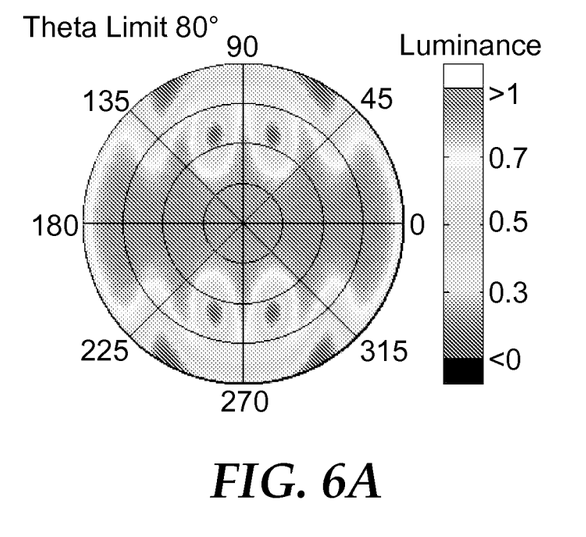
FIGS. 6A-B show the ray-tracing modeling results for an embodiment of an optical film stack.
Figure 6B:
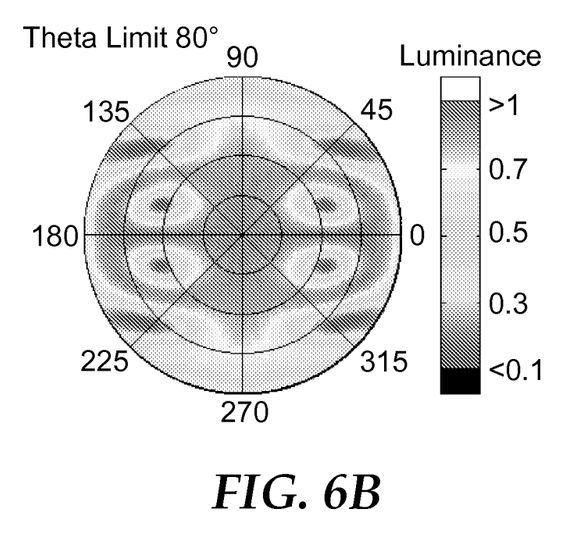
Figure 7A:
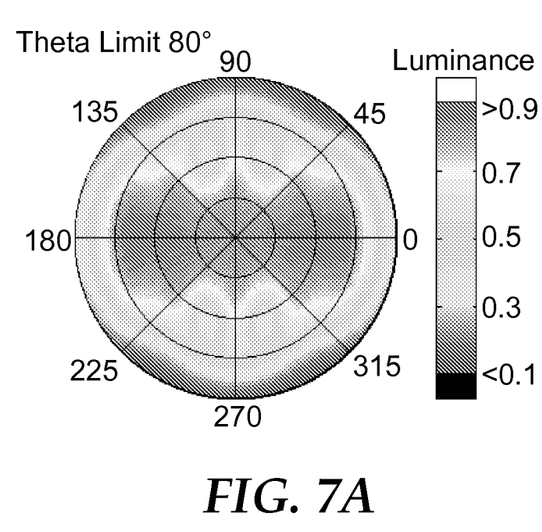
FIGS. 7A-B show the ray-tracing modeling results for an embodiment of an optical film stack.
Figure 7B:
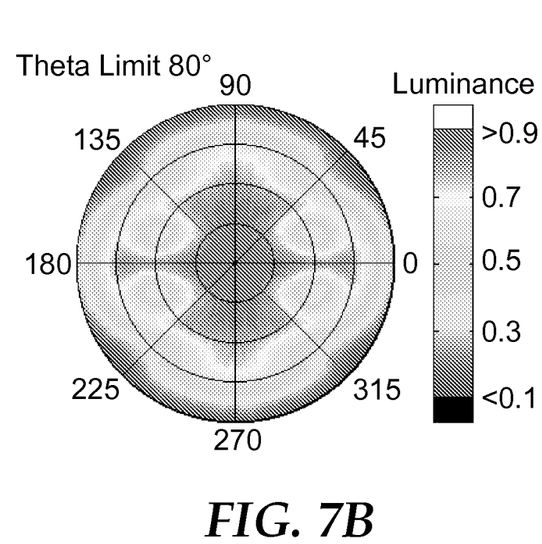

FIGS. 6A-B illustrate modeled results of the optical film stack of Comparative Example C1A. FIG. 6A is a conoscopic plot for a fast axis of zero degrees and FIG. 6B is a conoscopic plot for fast axis of 90 degrees. Both FIGS. 6A-B show very low luminance regions near a polar angle of 45 degrees. In FIG. 6B these low luminance regions are surrounded by high luminance regions. FIGS. 7A-B illustrate modeled results of the optical film stack of Comparative Example C1B, which differs from Comparative Example C1A by the introduction of a 60% haze in the optical film stack. Again the plots are for a fast axis of 0 degrees (FIG. 7A) and 90 degrees (FIG. 7B). It can be seen that haze reduces the amount of fringing but the fringe level is still high in this case.

Figure 8A:
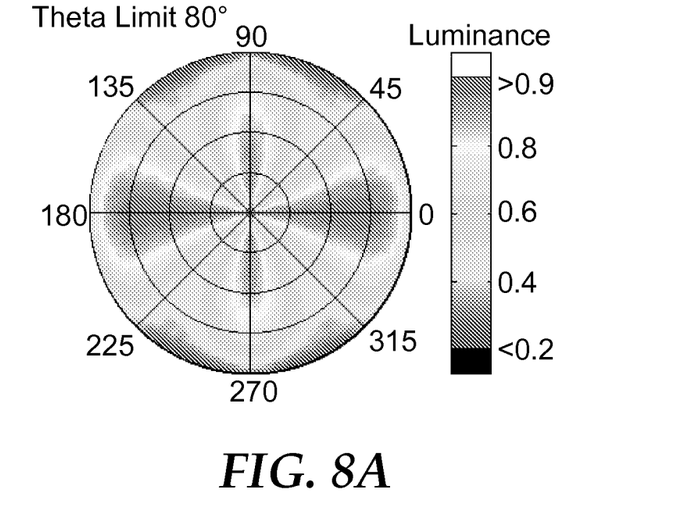
FIGS. 8A-B show the ray-tracing modeling results for an embodiment of an optical film stack.
Figure 8B:
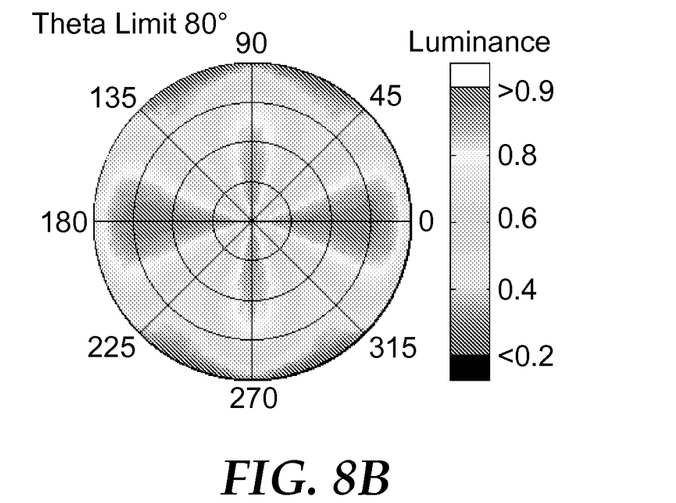

Similarly, FIGS. 8A-B illustrate the modeled results for Comparative Example C3. Again the plots are for a fast axis of 0 degrees (FIG. 8A) and 90 degrees (FIG. 8B). The lobes of high luminance are clustered into separate portions, with regions of very low luminosity between these bright lobes. There is a relatively small total solid angle in the conoscopic plot where the luminance is high.

Figure 9A:
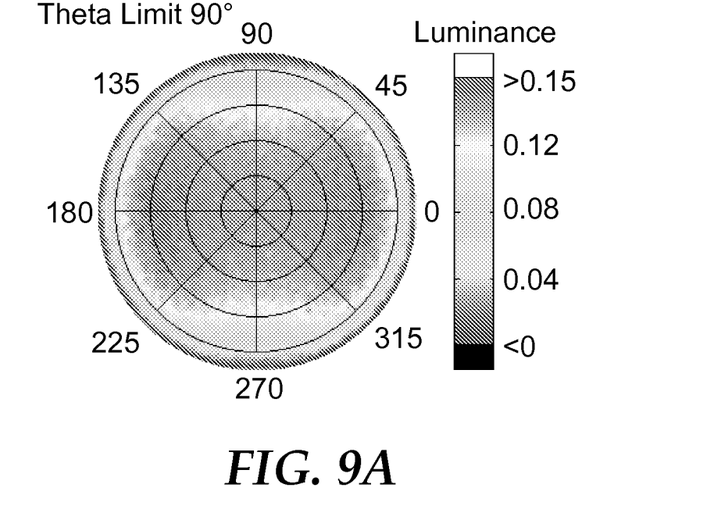
FIGS. 9A-B show the ray-tracing modeling results for an embodiment of an optical film stack.
Figure 9B:
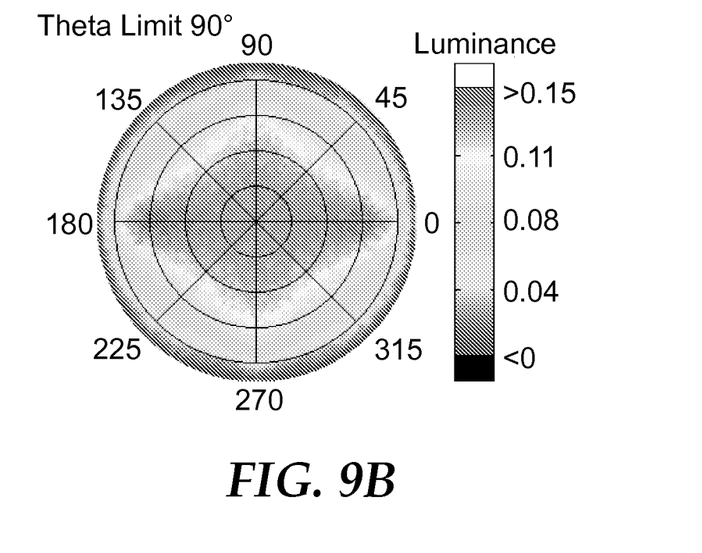
Figure 10A:
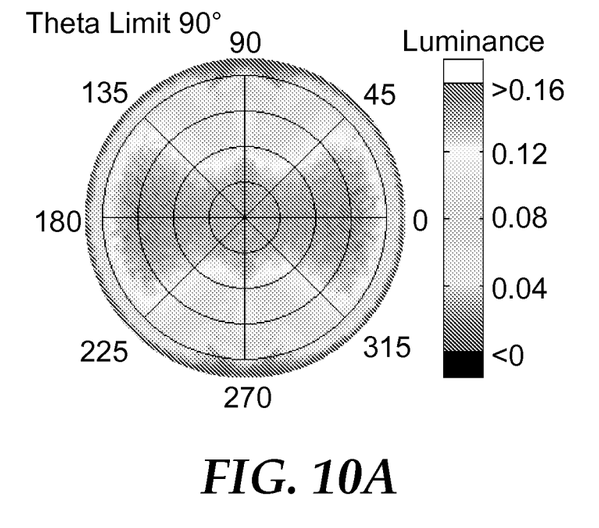
FIGS. 10A-B show the ray-tracing modeling results for an embodiment of an optical film stack.
Figure 10B:
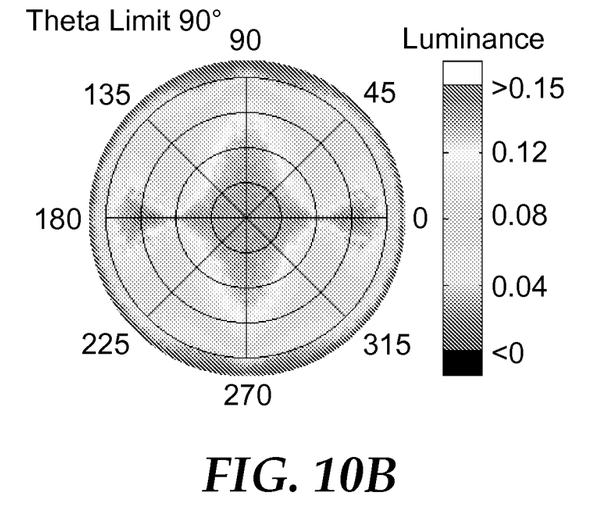

Conversely, FIGS. 9A-B illustrate the modeled results for Example 4. Again the plots are for a fast axis of 0 degrees (FIG. 9A) and 90 degrees (FIG. 9B). Both plots show a centralized, highly luminous lobe that is contiguous and not split into portions by low luminance regions. FIGS. 10A-B illustrate the modeled results for Example 2. Here the plot for a fast axis of 0 degrees (FIG. 10A) shows a centralized, highly luminous lobe that is contiguous and not split into portions by low luminance regions, while the plot for a fast axis of 90 degrees (FIG. 10B) shows a relatively large central lobe with separate smaller lobes at larger polar angles.

Figure 11:
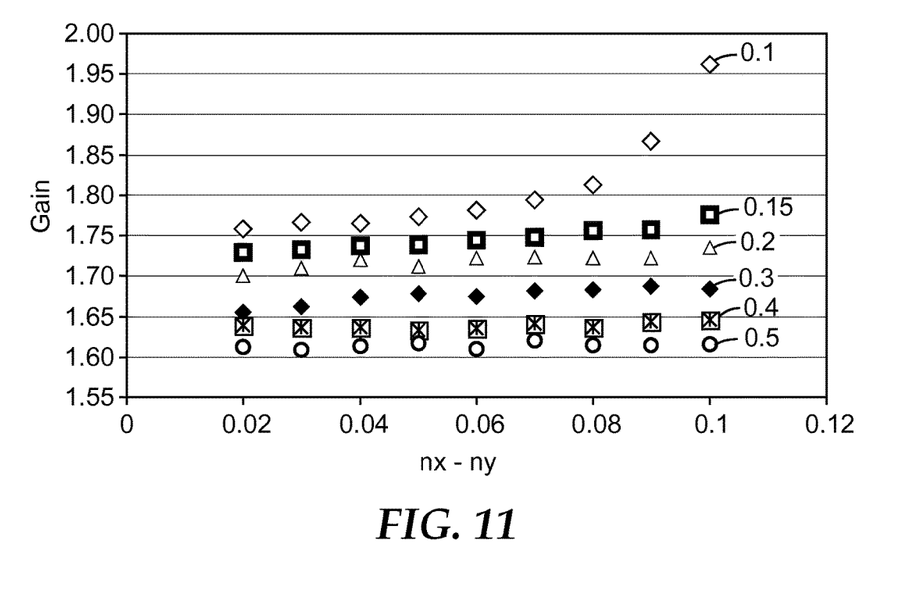
FIG. 11 is a graph of gain versus in-plane birefringence for films with various ratios of in-plane to out-of-plane birefringence.
Figure 12:
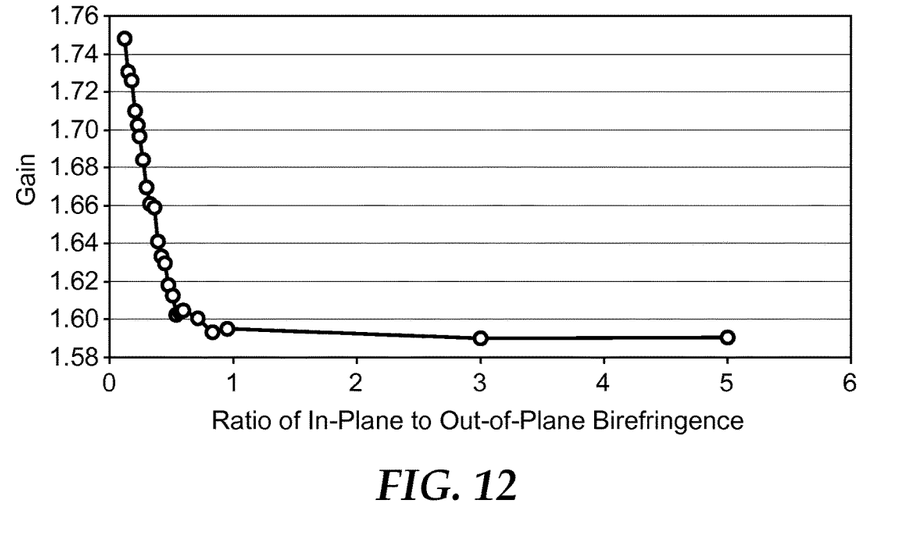
FIG. 12 is of a plot of gain versus the ratio of in-plane to out-of-plane birefringence.

FIG. 11 shows a plot of gain versus in-plane birefringence for various ratios of in-plane to out-of-plane birefringence and fast axis of 0 degrees. This plot shows that the gain is largely independent of the in-plane birefringence for a fixed ratio of in-plane to out-of-plane birefringence as long as this ratio is greater than about 0.1. For sufficiently large in-plane birefringence and sufficiently small ratio of the in-plane to out-of-plane birefringence, FIG. 11 shows some dependence of gain on the in-plane birefringence. However, the region of the plot where this occurs does not represent achievable values of $n_x$, $n_y$ and $n_z$. FIG. 12 shows a plot of gain versus the ratio of in-plane to out-of-plane birefringence where it can be seen that the gain drops with this ratio until it reaches about 1 where it plateaus and then very slowly drops. All samples used to generate FIGS. 11 and 12 were 76.2 microns thick and the absorption was taken to be 0.09 mm$^{-1}$.

It is to be understood that in any other embodiment disclosed within the entirety of this disclosure, a retardance layer may potentially exhibit the properties disclosed herein, even where the optical film stack includes other layers or elements.

The optical film stack described herein includes at least a first and second reflective polarizer with a retardance layer placed between the two polarizers. Such a construction, where the retardance layer exhibits the stated in-plane to out-of-plane ratio and retardance values for the retardance layer may achieve an improvement in optical gain. More specifically, the optical film stack may achieve an optical gain of at least 1.5, or at least 1.6, or at least 1.7, or at least 1.8. In some embodiments, the optical gain may be greater than 1.85.

Figure 3:
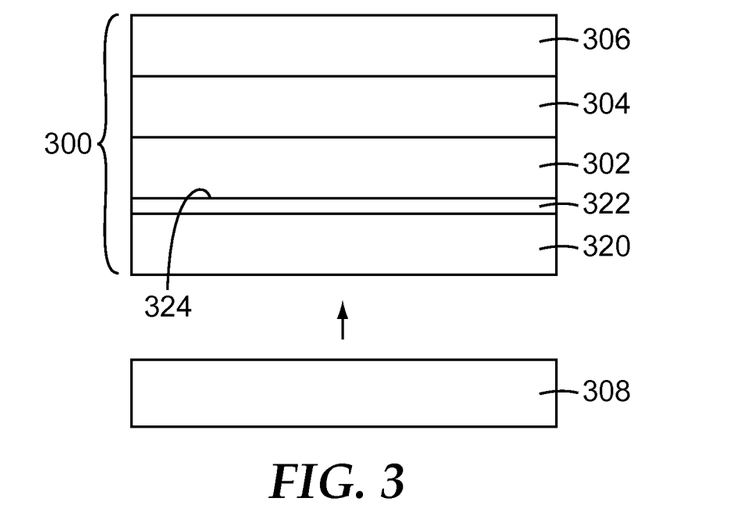
FIG. 3 is a cross-sectional view of another embodiment an optical film stack and a back light.

In some embodiments, the optical films stack may include other layers besides a first and second reflective polarizer and retardance layer. An example of one such film 300 is shown in FIG. 3. Optical film stack 300 includes first reflective polarizer 302, retardance layer 304 and second reflective polarizer 306. All of the design considerations and possibilities described herein regarding the optical film stack 100 and back light 108 of FIG. 1 apply equally to the optical film stack 300 and back light 308 of FIG. 3. The stack 300 also includes a diffuser plate 320 that is attached to the first reflective polarizer 302 on a side 324 that is opposite the retardance layer 304. The diffuser plate 320 may be attached to the first reflective polarizer 302 by any number of techniques, including mechanically coupling the two layers. For example, the diffuser plate 320 and first reflective polarizer 302 may be connected by an adhesive layer. In some embodiments, the adhesive will be optically transparent. The diffuser plate 320 is connected to the first reflective polarizer 302 by an optical coupling layer 322 that may be any suitable optically coupling adhering material. In at least some embodiments, this optical coupling layer 322 has a low index of refraction, such as less than 1.5, or less than 1.2. The optical coupling layer may be comprised of Silicone (n=1.41), MgF (n=1.39), Aerogel (n=1.1), or nanoporous polymer gel (n=1.15-1.3), just to name a few.

The diffuser plate 320 is used to diffuse the light received from the back light 308, which results in an increase in the uniformity of the illumination light that will ultimately be incident on an LC panel after exiting second reflective polarizer 306. The diffuser plate 320 may be based on a polymeric matrix, for example polymethyl methacrylate (PMMA), polycarbonate (PC), or cyclo-olefins, formed as a rigid sheet. The sheet contains diffusing particles, for example, organic particles, inorganic particles or voids (bubbles). In other embodiments, diffuser plates may include a rigid organic or inorganic substrate and a polymeric volume diffusing sheet possessing a specific transmission and haze level directly adjacent to one side of the substrate, where the structural and optical functions of the plate are separated into the two sheets, as described in commonly owned U.S. Pat. No. 7,446,827.

Figure 5:
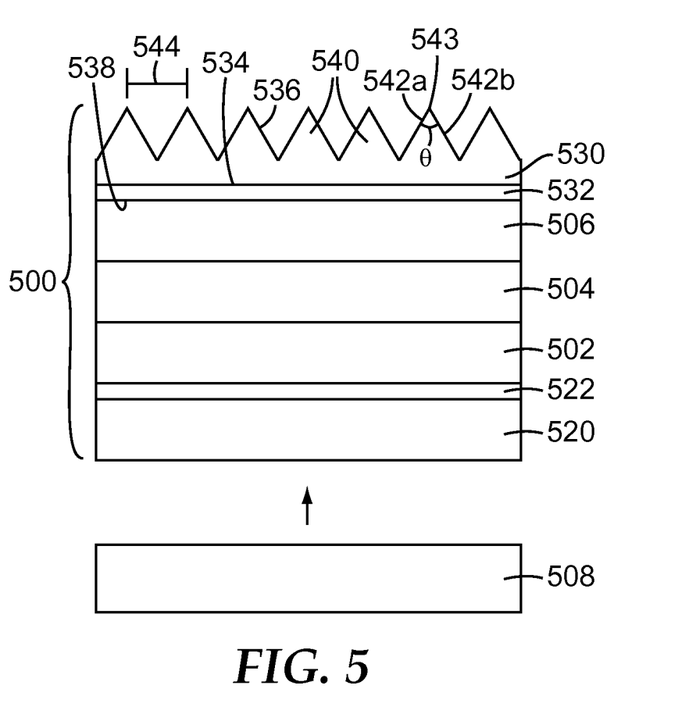
FIG. 5 is a cross-sectional view of another embodiment of an optical film stack and a back light according to the present description.

In a further embodiment, the optical film stack of the present description may contain further elements contributing to gain and contrast ratio enhancement. FIG. 5 illustrates a back light 508 directing light towards an optical film stack 500. In the present embodiment, the optical film stack includes a first reflective polarizer 502, second reflective polarizer 506 and retardance layer 504 disposed between the first and second reflective polarizers. All of the design considerations and possibilities described herein regarding the optical film stack 100 and back light 108 of FIG. 1 apply equally to the optical film stack 500 and back light 508 of FIG. 5. As with the embodiment in FIG. 3, the stack may optionally include a diffuser plate 520 on the side of first reflective polarizer 502 that is opposite retardance layer 504. The diffuser plate 520 may be connected to first reflective polarizer 502 by an optical coupling layer 522, where the optical coupling layer 522 may in some embodiments have an index of refraction less than 1.5 or less than 1.2 and may be made of any number of appropriate materials, e.g., the materials discussed with respect to optical coupling layer 322. (See above)

In addition, optical film stack 500 may include a brightness enhancement film 530. The brightness enhancement film may have a first major surface 534 and a second major surface 536. The first major surface may be a smooth surface that is attached to the second reflective polarizer. The first major surface 536 may attach to the second reflective polarizer 506 on a side 538 that is opposite the retardance layer 504. In at least some embodiments, the first major surface 536 of brightness enhancement film 530 is attached to the second reflective polarizer 506 by an adhesive layer 532. The adhesive layer 532 may generally have a low index of refraction, for example, less than 1.5, or less than 1.2, or it may be an index matching layer. The brightness enhancement film's second major surface 536 may generally be a structured surface that includes a plurality of prismatic structures 540 or lenslets or other protrusions such as cones or curved sided cones.

The brightness enhancement film 530 may corresponds generally to brightness enhancing films available from 3M Company, for example, the Vikuiti™ BEF II and BEF III family of prismatic films available from 3M Company, including BEF II 90/24, BEF II 90/50, BEF IIIM 90/50, and BEF IIIT.

Looking more specifically at prismatic structures 540, each structure may generally be understood as having a first facet 542a and a second facet 542b that meet at a peak 543. The peak angle, θ, may be between about 80 degrees and 110 degrees, or between about 85 degrees and about 95 degrees, or approximately 90 degrees. The prismatic structure peaks (e.g. 543) may have a near constant displacement from the adjacent peaks of the film 530. This space is understood as pitch 544. The pitch of the prismatic structures 540 of film 530 may be between about 20 microns and about 60 microns. In some embodiments, facets of the structures may be curved, and their peaks may be radiused. In some embodiments, the structures, rather than being prisms are lens-like or hemispheric protrusions, such as beads of a beaded gain diffuser. In different embodiments, the prismatic structures may be curve-sided cones, such as those described in commonly owned and assigned U.S. Patent Publication No. 2010/0128351. The structures may also be, for example, pyramids.

As with retardance layer 204 illustrated in FIG. 2, retardance layer 504 may be made up of two or more PET sublayers that are either aligned or crossed. As with the optical films stack that does not include BEF, the stack of FIG. 5 may achieve optical gain levels of at least 1.5, or at least 1.6, or at least 1.7, or at least 1.8. In some embodiments, the optical gain may even be above 1.85, and approach 1.9.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

We claim:

1. An optical film stack, comprising:
a first reflective polarizer having a pass axis;
a second reflective polarizer; and
a stretched polymeric retardance layer having a fast axis disposed between the first reflective polarizer and the second reflective polarizer, the retardance layer having a thickness, d, and having in-plane index of refraction values $n_x$ and $n_y$ and an index of refraction $n_z$ in a direction orthogonal to the plane of the film, wherein $$0.04 < |(n_x - n_y)/(0.5(n_x + n_y) - n_z)| < 1.00, \text{ and}$$

$$2.0 \text{ microns} < d \times |(n_x - n_y)| < 75 \text{ microns};$$

wherein the pass axis of the first reflective polarizer is within 20 degrees of parallel with the fast axis of the retardance layer.

2. The optical film stack of claim 1, wherein $0.12 < |(n_x - n_y)/(0.5(n_x + n_y) - n_z)| < 0.50$.

3. The optical film stack of claim 1, wherein $2.0 \text{ microns} < d \times (n_x - n_y) | < 25 \text{ microns}$.

4. The optical film stack of claim 1, further comprising a diffuser plate, the diffuser plate being attached to the first reflective polarizer on a side opposite the retardance layer.

5. The optical film stack of claim 4, wherein the diffuser plate and the first reflective polarizer are optically coupled by an optical coupling layer, the optical coupling layer having an index of refraction of less than 1.2.

6. The optical film stack of claim 1, wherein light traveling through the film stack has an optical gain of at least 1.5.

7. The optical film stack of claim 1, wherein a pass axis of the first reflective polarizer is substantially parallel to a pass axis of the second reflective polarizer.

8. The optical film stack of claim 1, wherein the first reflective polarizer and the second reflective polarizer are linear polarizers.

9. The optical film stack of claim 1, wherein the retardance layer comprises a first and second retardance sublayer.

10. The optical film stack of claim 9, wherein the first retardance sublayer has a first fast axis and the second retardance sublayer has a second fast axis, the first and second fast axes being substantially parallel.

11. The optical film stack of claim 9, wherein the first retardance sublayer has a first fast axis and the second retardance sublayer has a second fast axis, the first and second fast axes being substantially orthogonal.

12. An optical film stack, comprising:
a first reflective polarizer having a pass axis;
a second reflective polarizer; and
a stretched polymeric retardance layer having a fast axis disposed between the first reflective polarizer and the second reflective polarizer, the retardance layer having a thickness, d, and having orthogonal in-plane index of refraction values $n_x$ and $n_y$, and an index of refraction, $n_z$, in a direction orthogonal to the plane of the film, wherein $$0.04 < |(n_x-n_y)/(0.5(n_x+n_y)-n_z)| < 1.00, \text{ and}$$

$$2.0 \text{ microns} < d \times |(n_x-n_y)| < 75 \text{ microns};$$

a brightness enhancement film having a first and second major surface, the first major surface being a smooth surface attached to the second reflective polarizer on a side opposite the retardance layer, and the second major surface being a structured surface that comprises a plurality of prismatic structures;

wherein the pass axis of the first reflective polarizer is within 20 degrees of parallel with the fast axis of the retardance layer.

13. The optical film stack of claim 12, wherein $0.12 < |(n_x-n_y)/(0.5(n_x+n_y)-n_z)| < 0.50$.

14. The optical film stack of claim 12, wherein 2.0 microns $< d \times |(n-n_y)| < 25$ microns.

15. The optical film stack of claim 12, further comprising a diffuser plate, the diffuser plate being attached to the first reflective polarizer on a side opposite the retardance layer.

16. The optical film stack of claim 15, wherein the diffuser plate and first reflective polarizer are optically coupled by an optical coupling layer, the optical coupling layer having an index of refraction of less than 1.2.

17. The optical film stack of claim 12, wherein each prismatic structure of the plurality of prismatic structures has two facets that meet at a peak, the peak having a peak angle of approximately 90 degrees.

18. The optical film stack of claim 12, wherein light traveling through the film stack has an optical gain of greater than 1.5.

19. The optical film stack of claim 12, wherein the retardance layer comprises a first and second retardance sublayer.

20. The optical film stack of claim 19, wherein the first retardance sublayer has a first fast axis and the second retardance sublayer has a second fast axis, the first and second fast axes being substantially parallel.

21. The optical film stack of claim 19, wherein the first retardance sublayer has a first fast axis and the second retardance sublayer has a second fast axis, the first and second fast axes being substantially orthogonal.

22. The optical film stack of claim 12, wherein a pass axis of the first reflective polarizer is substantially parallel to a pass axis of the second reflective polarizer.

23. The optical film stack of claim 12, further comprising an adhesive layer attaching the first major surface of the brightness enhancement film and the second reflective polarizer, the adhesive layer having an index of refraction of less than 1.2.

* * * * *